United States Patent [19]

Oliboni et al.

[11] Patent Number: 5,309,483
[45] Date of Patent: May 3, 1994

[54] DATA RECOVERY DEVICE

[75] Inventors: Mark L. Oliboni; James G. Mittel, both of Boynton Beach, Fla.; Richard A. Erhart, Chandler, Ariz.

[73] Assignee: Motorola, Inc., Schaumburg, Ill.

[21] Appl. No.: 760,657

[22] Filed: Sep. 16, 1991

[51] Int. Cl.$^5$ .................................... H04L 7/00
[52] U.S. Cl. ................................ 375/106; 328/63
[58] Field of Search ............... 375/101, 106, 118, 119, 375/94, 97, 39; 328/63, 72; 307/511, 518, 523

[56] References Cited

U.S. PATENT DOCUMENTS

| | | | |
|---|---|---|---|
| 3,978,407 | 8/1976 | Forney, Jr. et al. | 375/39 |
| 4,039,749 | 8/1977 | Gordy et al. | 375/97 |
| 5,048,060 | 9/1991 | Arai et al. | 375/106 |
| 5,073,905 | 12/1991 | Dapper et al. | 307/518 |
| 5,103,464 | 4/1992 | Capkun et al. | 328/72 |
| 5,127,026 | 6/1992 | Kelly et al. | 328/63 |

Primary Examiner—Stephen Chin
Attorney, Agent, or Firm—Gregg E. Rasor; Thomas G. Berry; Pablo Meles

[57] ABSTRACT

A data recovery device (208) for recovering data symbols having a period T from a received data stream. The data recovery device samples at least one data symbol in the received data stream at a rate determined by an integration envelope (301) having the period T. The samples are accumulated as a weighted sample count representing a recovered data symbol that is then stored as at least one recovered data bit.

20 Claims, 3 Drawing Sheets

DATA RECOVERY DEVICE

FIELD OF THE INVENTION

This invention relates in general to data recovery devices and more particularly to a variable multiple sample data recovery device used in conjunction with an information receiver.

BACKGROUND OF THE INVENTION

Radio communication systems typically use a receiver (e.g., a selective call receiver or "pager") that has at least one unique call address. These radios receive and decode an address, then typically alert the user to the presence of incoming information and operate to present this information. Radio communication systems are an excellent vehicle for delivering voice, numeric, alphanumeric or coded information to a user.

Contemporary digital radio receivers employ a data recovery device that synchronizes to a bit stream of a fixed data rate, then center samples each symbol period to determine the state of the data received This system works well under ideal signal conditions, but when the receiver is operated on a radio channel that experiences probabilistic phenomena such as fading or external noise, the received data may be corrupted to the point that a single sample of a symbol will not recover the correct data state.

Many of the present efforts for improving digital receiver sensitivity rely on better bit synchronization algorithms to provide consistent symbol location in both asynchronous and synchronous signalling systems. However, these efforts fall short in the area of improving overall sensitivity because they neglect the fact that even if perfect bit synchronization is achieved, the probability of error for falsely detecting the state of a received bit is increased when a single sample is taken over the symbol period. Applying error detecting and correcting coding to the digital data can alleviate some problems and improve reliability, but this still does not correct the basic deficiency caused by bad data being detected.

SUMMARY OF THE INVENTION

Briefly, according to the invention, there is provided a data recovery device for recovering data symbols having a period T from a received data stream. The data recovery device samples at least one data symbol in the received data stream at a rate determined by an integration envelope having the period T. The samples are accumulated as a weighted sample count representing a recovered data symbol that is then stored as at least one recovered data bit.

DESCRIPTION OF A PREFERRED EMBODIMENT

Figure 1:
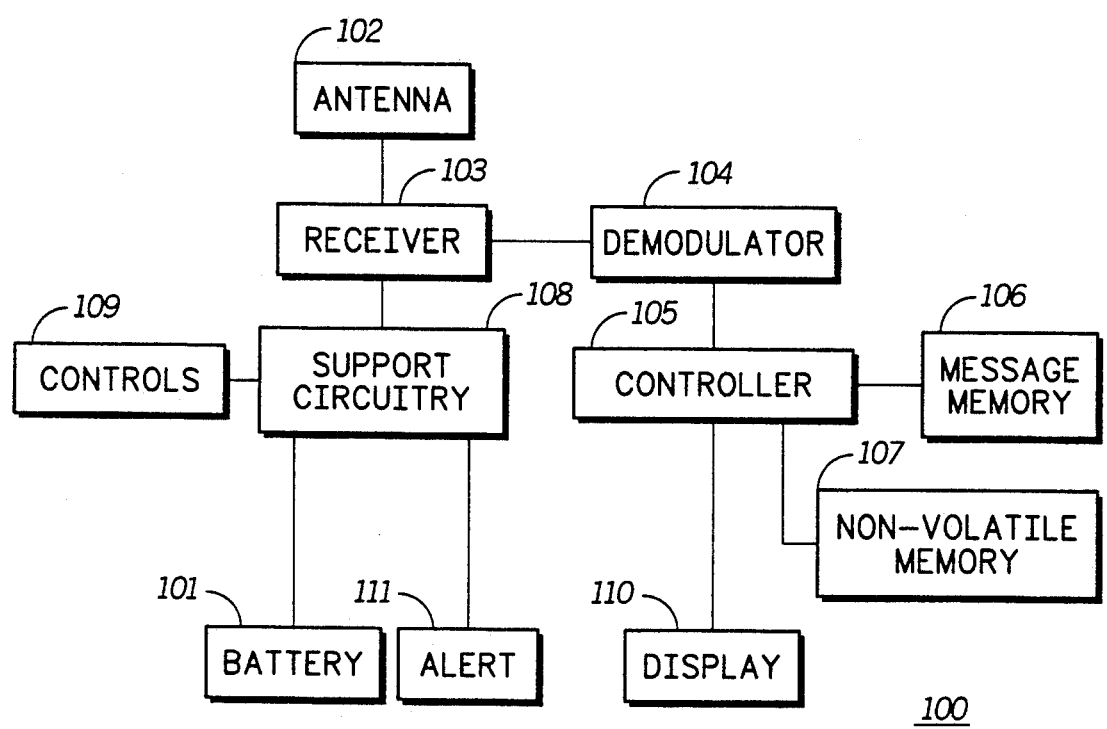
FIG. 1 is a block diagram of a selective call receiver.

Referring to FIG. 1, a battery 101 powered selective call receiver operates to receive a signal via an antenna 102. A receiver 103 couples a received signal to a demodulator 104, which recovers any information present using conventional techniques. The recovered information is coupled to a controller 105 that interprets and decodes the recovered information. In the preferred embodiment, the controller 105 may comprise a bit synchronizer, a data recovery device, and a microprocessor. These elements comprise a signal processor (decoder) implemented in both hardware and software The recovered information is checked by the decoder, which correlates a recovered address with a predetermined address stored in the selective call receiver's 100 non-volatile memory 107. The non-volatile memory 107 typically has a plurality of registers for storing a plurality of configuration words that characterize the operation of the selective call receiver In determining the selection of the selective call receiver, a correlation is performed between a predetermined address associated with the selective call receiver and a received address. When the addresses correlate, the controller 105 couples message information to the message memory 106 In accordance with the recovered information, and settings associated with the user controls 109, the selective call receiver includes a presentation means that presents at least a portion of the message information, such as by a display 110, and signals the user via an audible or tactile alert 111 that a message has been received. The user may view the information presented on the display 110 by activating the appropriate controls 109.

The support circuit 108 preferably comprises a conventional signal multiplexing integrated circuit, a voltage regulator and control mechanism, a current regulator and control mechanism, environmental sensing circuitry such as for light or temperature conditions, audio power amplifier circuitry, control interface circuitry, and display illumination circuitry. These elements are arranged in a known manner to provide the information display receiver as requested by the customer.

Figure 2:
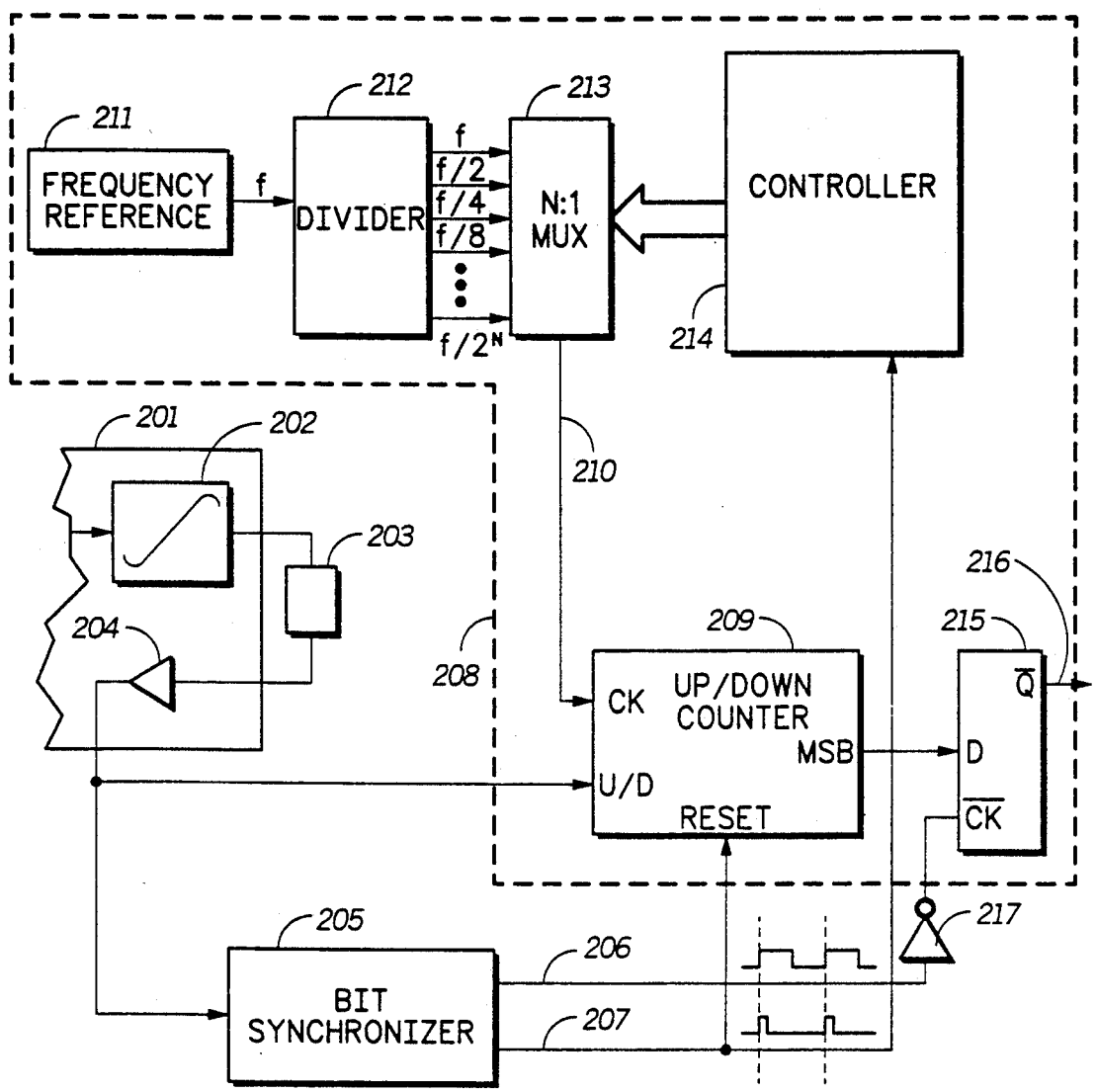
FIG. 2 is a block diagram showing a portion of a digital data receiver and illustrating the signal flow of recovered data in accordance with the present invention.

Referring to FIG. 2, the block diagram shows a portion of a digital data receiver and illustrates the signal flow of recovered data. A radio frequency receiver 201 having a conventional demodulator 202 recovers modulation from a modulated radio frequency carrier signal. The recovered modulation is filtered 203 and limited 204 as is conventional in a frequency modulation receiver After limiting and filtering, the recovered modulation (limited data) representing a received data stream is processed by a bit synchronizer 205. The bit synchronizer 205 samples the received data stream to accurately determine a transition region where a received data symbol traverses from at least a first state to a second state, and a symbol period corresponding to a received channel data rate. Once these parameters are determined, a reference timing signal is generated from which any other signals required to be synchronized to the received data stream are referenced. In the present embodiment, the bit synchronizer 205 generates a 50% duty cycle reference clock 206 having its edges positioned coincident with data symbols to be recovered from the received data stream. The bit synchronizer 205 also generates a synchronizing pulse 207 as a reference for controlling elements in the data recovery device 208.

Figure 3:
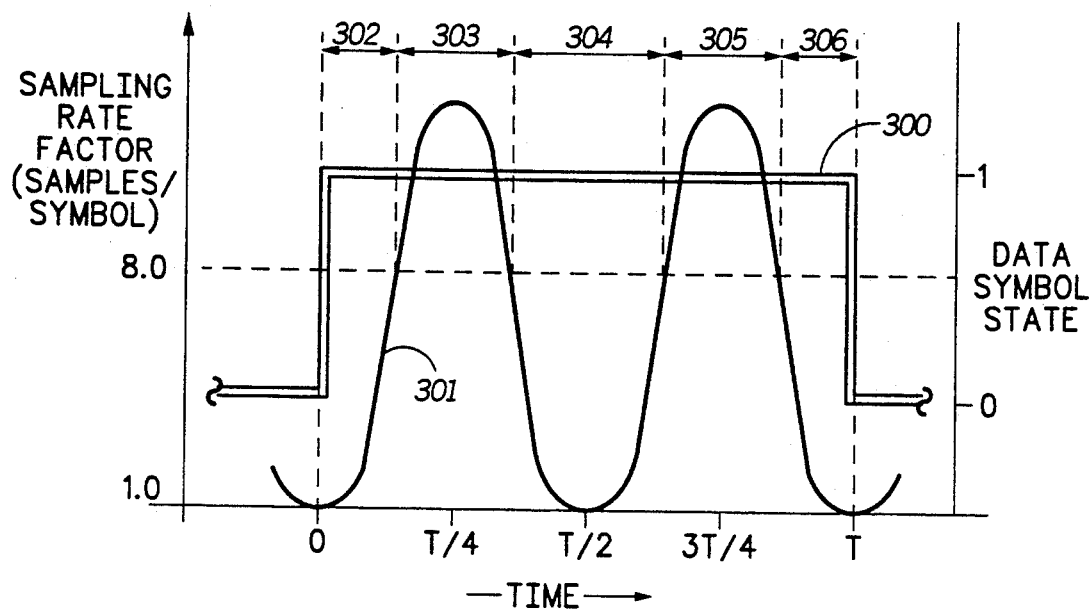
FIG. 3 illustrates a recovered data symbol and an integration envelope representative of one that may be used in operating the data recovery device in accordance with the present invention.
Figure 4:
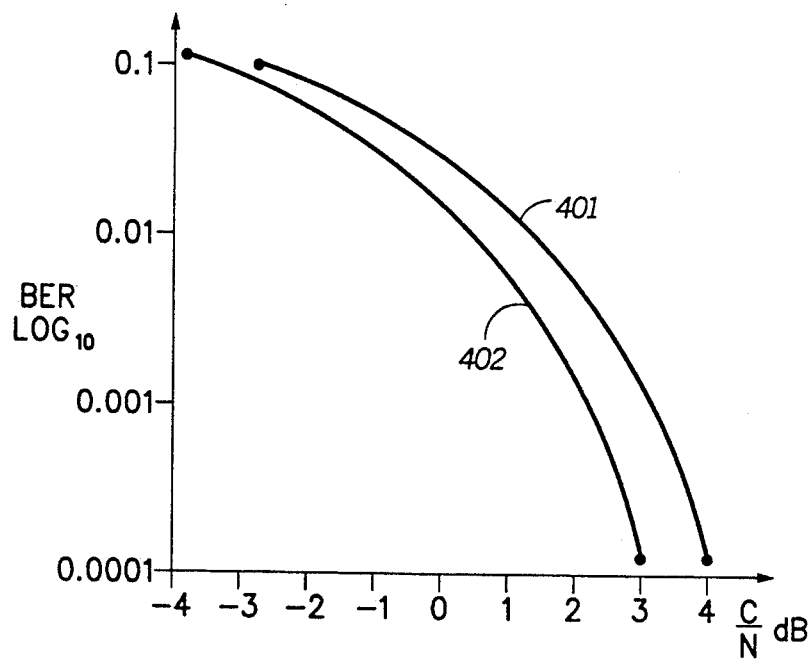
FIG. 4 is a plot of bit error rate versus receiver carrier to noise ratio showing curves for a conventional single sample data recovery device and a multiple sample data recovery device operated in accordance with the present invention.

The received data stream is coupled to a clocked up/down counter 209 that samples the received data stream at a rate determined by the frequency of a sample clock signal 210 derived from a master frequency reference 211. Generation of the sample clock signal 210 is accomplished by selecting one of N frequency inputs from a frequency divider 212 coupled to the master frequency reference 211. The frequency divider is conventional in nature and may be constructed from a chain of D flip-flops coupled in series and configured to divide the master frequency by 2N with N ranging from 1 to M. Since a selection circuit 213 that controls the frequency of the sample clock signal 210 is governed by a controller 214 (e.g., a microcomputer or custom integrated circuit) that has the synchronizing pulse 207 available as a timing reference, the sample clock signal 210 may be varied in rate versus the time within a symbol period as delineated by the synchronizing pulse 207. This feature allows the data stream to be sampled at rates corresponding to different envelopes as shown in FIG. 3, resulting in a weighted sample count. By adjusting the sampling rate in this manner, an optimal correlation envelope can be applied to the recovered modulation, thereby yielding improved bit error rate (BER) performance at a particular receiver carrier to noise ratio. This system yields significant advantages when signal levels approach the 0 dB C/N region where constructive phase summations of noise cause impulses in the recovered signal known as "clicks." If a click occurs near the center of a bit, conventional sampling systems that adjust themselves to "center sample" (sample at the approximate center of a bit) will falsely record a wrong signal state for the bit being sampled. The present invention overcomes this problem by using the weighted sample count that effectively integrates the power density over the bit interval. In applying this technique, the BER versus C/N curve is significantly improved as shown in FIG. 4. The up/down counter 209 acts as an integrator in the following manner: at the beginning of a symbol time frame the counter is reset by the synchronizing pulse 207. After being reset, the up/down counter 209 is clocked by the sample clock signal 210 and counts up or down depending on the state of the limited data signal. The length of the up/down counter 209 is chosen such that when the fastest sample clock signal 210 is applied for at least one symbol time, the counter will not over or underflow. Operationally, the up/down counter 209, after being reset by the synchronizing pulse 207, contains all zeros (or possibly all ones if inverted logic is chosen). In the case where the state of the limited data signal is high (logic 1), the counter will, upon being clocked by the sample clock signal 210, begin to propagate an up-count sequence from the least significant bit (LSB) to the most significant bit (MSB). If at the end of the symbol period the MSB is zero, this indicates that a recovered data symbol represented by the limited data was a logic 1. Similarly, in the case where the state of the limited data signal is low (logic 0), the counter will, upon being clocked by the sample clock signal 210, begin to propagate a down-count sequence from the least significant bit (LSB) to the most significant bit (MSB). If at the end of the symbol period the MSB is one, this indicates that the recovered data symbol represented by the limited data was a logic 0. Assuming that the integrator operates on a real signal having noise present, the resultant integration is always valid when the signal state, as sampled from the limited data signal, dominates the noise present in the limited data signal. This condition is insured by selecting the optimal correlation envelope corresponding to maximum sampling in regions of high signal power spectral density and minimum sampling in regions of high noise power spectral density. The correlation envelope applied may be mathematically derived as a function of the modulation signal type or from empirical data taken on the received signal and matched to optimal signal to noise considerations.

Following completion of the symbol period, a data storage element (edge triggered clocked D flip-flop) 215 receives and stores the MSB output of the clocked up/down counter 209 and presents its complement as a recovered data bit 216. In a multi-level data transmission system the symbol may represent one or more data bits that would be recovered in a similar manner as at least one recovered data bit. The data storage element 215 is triggered by the reference clock 206 supplied from the bit synchronizer 205 that is coupled to an inverted clock input via an inverter 217. After the recovered data bit 216 is stored, the synchronizing pulse 207 resets the up/down counter 209 and notifies the controller to start a new sample cycle. This process is continuously repeated during the operation of the data recovery device 208.

Referring to FIG. 3, the illustration shows an integration envelope representative of one that may be used in operating the data recovery device in accordance with the present invention. The illustration shows a recovered data symbol 300 that transitions from a logic 0 state at the beginning of a symbol time period T, to a logic 1 state. The recovered data symbol stays in the logic 1 state for the duration of the symbol time period T.

The integration envelope(s) available would typically be stored non-volatile memory in the controller 214 as a look-up table or possibly a mathematical equation. This does not preclude the possibility of adaptively creating an optimal integration envelope using conventional search and signal processing techniques. As the relative value of the waveform 301 increases, the sample rate increases. The base line or minimum sampling rate is set at one sample per symbol time period. Using this as a guide, the envelope illustrated changes the sample rate from 1 sample per symbol 302, to 8 samples per symbol 303, to 1 sample per symbol 304, to 8 samples per symbol 305, then to 1 sample per symbol 306. The resultant accumulation would include "logic 1" samples during intervals 303, 304, and 305. The resulting weighted sum would be five with two being contributed during each of intervals 303 and 305, and one being contributed during interval 304. If the accumulator length for this exemplary implementation was chosen at four bits (a maximum count of +16 or −15), a count of five would represent a logic 1 for the sampled symbol. In order for a false symbol detection to occur, the count must have been at least −1 which would require logic 0's to be detected in either of intervals 303 and 305 as well as in interval 304. If the count were less than −1, the symbol undergoing detection was probably a logic zero, not a logic 1 as in this example. This example allows proper detection of a symbol that has high noise densities (poor signal to noise) at the beginning, middle, and end of a symbol time period. This case is indicative of the threshold region in which "clicks" occur. The controller 214 may also include means for detecting the relative signal strength in the receiver such that the integration envelope can be changed according to receiver C/N falling in a predetermined region. In this way, the system will always optimally detect the data being recovered.

Referring to FIG. 4, a plot of bit error rate versus receiver carrier to noise ratio shows curves for a conventional single sample data recovery device 401 and a multiple sample data recovery device 402 operated in accordance with the present invention. These curves are the result of empirical data taken on a narrowband receiver using binary frequency shift keyed modulation at a peak deviation of 4.5 KHz and a symbol data rate of 1200 Hz. The multiple sample data recovery device was operated using 8 samples per symbol time. Note that the typical sensitivity improvement in the multiple sample data recovery system is at least 1 dB. This improvement translates to a minimum increase of 15% in the probability of correctly recovering digital data from a radio frequency transmission received at or near the threshold of the receiver's sensitivity.

We claim:

1. A data recovery device for recovering data symbols having a period T from a received data stream, the data recovery device comprising:
   means for generating a reference clock signal in response to a received channel data rate corresponding with the period T associated with a recovered data symbol;
   means for generating a synchronizing pulse coupled to the means for generating the reference clock signal, the synchronizing pulse functioning to delineate a data symbol sampling period relative to the reference clock signal and corresponding with the period T associated with the recovered data symbol;
   means for sampling at least one data symbol in the received data stream during the data symbol sampling period in response to the synchronizing pulse and accumulating a plurality of sample values as a weighed sample count at a rate determined by an integration envelope having the period T, the weighted sample count representing a recovered data symbol; and
   means for storing the recovered data symbol from the sampling means as at least one recovered data bit.

2. The data recovery device according to claim 1 wherein the means for generating a reference clock signal comprises a bit synchronizer.

3. The data recovery device according to claim 1 wherein the recovered data symbol is stored in the storage means in response to the reference clock signal.

4. The data recovery device according to claim 1 wherein the storage means comprises a clocked D flip-flop.

5. The data recovery device according to claim 3 further comprising:
   means for generating a sample clock signal having a frequency; and
   means for controlling the frequency of the sample clock signal in response to the integration envelope selected by a controller means and the synchronizing pulse.

6. The data recovery device according to claim 5 wherein the sample clock signal is coupled from the generating means to the sampling means.

7. The data recovery device according to claim 1 wherein the sampling means comprises a clocked up/down counter.

8. The data recovery device according to claim 5 wherein the means for generating a sample clock signal comprises:
   a master frequency reference;
   a frequency divider coupled to the master frequency reference;
   a selection circuit coupled to the frequency divider and to the controlling means, the selection circuit operating to provide one of N frequencies from the frequency divider as the sample clock in response to the integration envelope selected by the controlling means.

9. A selective call receiver having a data recovery device for recovering data symbols having a period T from a received data stream, the selective call receiver comprising:
   means for generating a reference clock signal in response to a received channel data rate corresponding with the period T associated with a recovered data symbol;
   means for generating a synchronizing pulse coupled to the means for generating the reference clock signal, the synchronizing pulse functioning to delineate a data symbol sampling period relative to the reference clock signal and corresponding with the period T associated with the recovered data symbol;
   means for sampling at least one data symbol in the received data stream during the data symbol sampling period in response to the synchronizing pulse and accumulating a plurality of sample values as a weighted sample count at a rate determined by an integration envelope having the period T, the weighted sample count representing a recovered data symbol; and
   means for storing the recovered data symbol from the sampling means as at least one recovered data bit.

10. The selective call receiver according to claim 9 wherein the recovered data symbol is stored in the storage means in response to the reference clock signal.

11. The selective call receiver according to claim 10 further comprising:
   means for generating a sample clock signal having a frequency; and
   means for controlling the frequency of the sample clock signal in response to the integration envelope selected by a controller means and the synchronizing pulse.

12. The selective call receiver according to claim 7 wherein the sample clock signal is coupled from the generating means to the sampling means.

13. The selective call receiver according to claim 9 wherein the sampling means comprises a clocked up/down counter.

14. The selective call receiver according to claim 9 wherein the storage means comprises a clocked D flip-flop.

15. The selective call receiver according to claim 9 wherein the means for generating a reference clock signal comprises a bit synchronizer.

16. The selective call receiver according to claim 11 wherein the means for generating a sample clock signal comprises:
   a master frequency reference;
   a frequency divider coupled to the master frequency divider and to the controlling means, the selection circuit operating to provide one of N frequencies from the frequency divider as the sample clock in response to the integration envelope selected by the controlling means.

17. In a selective call receiver, a method for recovering data symbols having a period T from a received data stream, the method comprising the steps of:
   generating a reference clock signal in response to a received channel data rate corresponding with the period T associated with a recovered data symbol;
   generating a synchronizing pulse that functions to delineate a data symbol sampling period relative to the reference clock signal and corresponding with the period T associated with the recovered data symbol;
   sampling at least one data symbol in the received data stream during the data symbol sampling period in response to the synchronizing pulse and accumulating a plurality of sample values as a weighted sample count at a rate determined by an integration envelope having the period T, the weighted sample count representing a recovered data symbol; and
   storing the recovered data symbol as at least one recovered data bit.

18. The method according to claim 17 comprising the step of:
   storing the recovered data symbol in response to the reference clock signal.

19. The method according to claim 17 further comprising the step of:
   generating a sample clock signal having a frequency; and
   controlling the frequency of the sample clock signal in response to the integration envelope selected and the synchronizing pulse.

20. The method according to claim 19 wherein the generating step comprises the steps of:
   generating a master frequency reference;
   dividing the master frequency reference to create a plurality of frequencies;
   selecting one of the plurality of frequencies as the sample clock in response to the integration envelope selected.

* * * * *

UNITED STATES PATENT AND TRADEMARK OFFICE
CERTIFICATE OF CORRECTION

PATENT NO.   : 5,309,483
DATED        : May 3, 1994
INVENTOR(S)  : Mark L. Oliboni, et al.

It is certified that error appears in the above-indentified patent and that said Letters Patent is hereby corrected as shown below:

Column 6, line 65, after master frequency insert --reference; a selection circuit coupled to the frequency--.

Signed and Sealed this

Ninth Day of January, 1996

Attest:

BRUCE LEHMAN

*Attesting Officer*     Commissioner of Patents and Trademarks